(12) United States Patent
Higashisaka et al.

(10) Patent No.: US 7,891,601 B2
(45) Date of Patent: Feb. 22, 2011

(54) TAPE REEL

(75) Inventors: Yoshiaki Higashisaka, Osaka (JP); Hirofumi Sakagami, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 0 days.

(21) Appl. No.: 12/397,842

(22) Filed: Mar. 4, 2009

(65) Prior Publication Data
US 2009/0250547 A1 Oct. 8, 2009

(30) Foreign Application Priority Data
Mar. 5, 2008 (JP) .............................. 2008-054919
Feb. 19, 2009 (JP) .............................. 2009-036660

(51) Int. Cl.
B65H 75/14 (2006.01)
B65H 75/18 (2006.01)

(52) U.S. Cl. .................... 242/609.1; 242/609; 242/608; 242/608.2

(58) Field of Classification Search ................ 242/608, 242/608.2, 608.6, 609, 609.1, 613.4
See application file for complete search history.

(56) References Cited

U.S. PATENT DOCUMENTS

| | | | | | |
|---|---|---|---|---|---|
| 2,575,025 | A | * | 11/1951 | Mihalyi | .................. 242/580.1 |
| 3,002,610 | A | * | 10/1961 | Granger | ...................... 206/398 |
| RE26,556 | E | * | 3/1969 | Hultgren | .................. 242/610.4 |
| 3,797,777 | A | * | 3/1974 | Hosono et al. | .............. 242/346 |
| 4,254,919 | A | * | 3/1981 | Moodie | ...................... 242/520 |
| 4,807,826 | A | * | 2/1989 | Iwahashi | ...................... 242/608 |
| 5,174,520 | A | * | 12/1992 | Iwahashi | .................. 242/608.8 |
| 5,236,145 | A | * | 8/1993 | Floury et al. | ................. 242/603 |
| 6,955,322 | B1 | * | 10/2005 | Vanderheyden | .......... 242/608.8 |
| 7,300,016 | B2 | * | 11/2007 | Brown et al. | ............. 242/613.4 |
| 2003/0226931 | A1 | * | 12/2003 | Morita | .................... 242/610.4 |
| 2006/0043227 | A1 | | 3/2006 | Iino et al. | |

FOREIGN PATENT DOCUMENTS

| | | |
|---|---|---|
| JP | 7-320447 A | 12/1995 |
| JP | 2003-7030 A | 1/2003 |
| JP | 2005-78784 A | 3/2005 |
| JP | 2006-92611 A | 4/2006 |

* cited by examiner

*Primary Examiner*—Emmanuel M Marcelo
(74) *Attorney, Agent, or Firm*—Birch, Stewart, Kolasch & Birch, LLP

(57) ABSTRACT

The tape reel of the present invention includes: a cylindrical hub for winding recording tape; and a pair of upper and lower flanges respectively projecting circumferentially from upper and lower portions of the hub. The tape reel further comprises: a lower piece including the lower flange and a first cylinder wall formed integrally with the lower flange; and an upper piece including the upper flange and a second cylinder wall formed integrally with the upper flange. The hub is formed in a double cylinder form by a fit engagement between the first cylinder wall of the lower piece and the second cylinder wall of the upper piece.

13 Claims, 6 Drawing Sheets

TAPE REEL

FIELD OF THE INVENTION

The present invention relates to a tape reel including a cylindrical hub for winding recording tape and a pair of upper and lower flanges respectively projecting circumferentially from an upper portion and a lower portion of the hub.

DESCRIPTION OF RELATED ART

The problems of this type of tape reel include preventing the reel from being tightened by the recording tape when winding the tape. That is, when a large tape winding force is applied to the hub, a cylinder wall of the hub deforms inwardly.

Conventional measures for preventing the reel from being tightened by winding tape include increasing the wall thickness of the hub cylinder wall, selecting a material to be used for the hub cylinder wall, and the like. For example, in Patent document 1, the rigidity of the hub is enhanced by providing the hub with an annular space portion whose lower side is open, and filling the space portion with a synthetic resin using coinjection molding. According to this configuration, since a compressive deformation stress in the direction toward the center of the hub can be increased, even if a large tape winding force is applied to the hub cylinder wall in a high temperature, the upper end portion of the hub cylinder wall can be surely prevented from deforming inwardly.

In Patent document 2, a notch having an upwardly stepped receiving surface is formed in a circle between the upper end surface and the inner side surface of a hub cylinder wall that is integrally molded with a lower flange. By mounting on the notch an annular reinforcing member that is received by the receiving surface, the upper end of the hub cylinder wall is prevented from deforming inwardly.

In Patent document 3, a downwardly-extending circular boss is provided on the rim of an opening formed at the center of an upper flange, and the deformation of the hub is prevented by receiving the circular boss with an inner peripheral surface of the upper end of the hub cylinder wall.

Patent document 4 proposes a reel including: a first member formed integrally with a first flange on one end side of a hub in its axis direction; and a second member formed integrally with a second flange and a fixing portion fixed to the first member other than the hub (see claim 1 of Patent document 4).

With this configuration, since the second flange (second member) is not fixed to the opening end of the hub, in other words, since deformation of the hub does not transfer to the second flange, the second flange is prevented or inhibited from being displaced toward the recording tape side or from deforming due to the deformation of the hub, which is caused by a winding pressure of the recording tape.

In contrast, the first flange is prevented from being displaced toward the recording tape side or from deforming, for example, by enhancing the rigidity of the hub (there are only few constraints in enhancing the rigidity of the hub to which the second member is not fixed) and setting the strength of the hub against the winding pressure lower on the first flange side than on the other end side (paragraph 0009 of Patent document 4).

However, each configuration for preventing the reel from being tightened by winding the tape as described above has the following problem.

When the rigidity of the hub is enhanced by increasing the wall thickness of the hub cylinder wall, a problem relating to molding occurs. That is, since the wall thickness of the hub cylinder wall becomes unavoidably larger than that of the flanges, the wall thicknesses of the hub and the flanges become different, and unsightly sink marks (dents) appear on the surface of the thickened portion.

In a case where the hub is made of a material containing a glass filler, the manufacturing cost of the tape reel including the hub increases, which results in an increase in the product unit price. Further, mixing of a glass filler is a significant burden on a molding machine and a mold, and this also results in an increase in the product unit price.

In the reel described in Patent document 1, the hub is prevented from deforming by providing a reinforced portion in the hub using coinjection molding to enhance the rigidity of the hub. However, the number of manufacturing steps increases by performing the coinjection molding, which results in an increase of the manufacturing cost of the tape reel.

A tape reel provided with an annular reinforcing member as in Patent document 2 has a complex structure. Further, the number of parts increases by providing the reinforcing member, which results in an increase in the manufacturing cost of the tape reel.

In the tape reel described in Patent document 3, deformation of the hub cylinder wall is merely prevented by the circular boss with a small wall thickness. Thus, when a strong tape winding force is applied to the hub in a high temperature, the possibility of the upper end portion of the hub cylinder wall deforming inwardly still remains.

The tape reel described in Patent document 4 has a configuration in which the hub is purposefully tilted inwardly so as to prevent the upper and the lower flanges from coming into contact with the magnetic tape. This configuration, however, is not for preventing the deformation of the hub.

The present invention is to solve the problems of the conventional tape reels, and an object of the present invention is to provide a tape reel in which a hub is prevented from being tilted inwardly by enhancing the rigidity of the hub with a simple configuration.

Patent document 1: JP H7-320447 A
Patent document 2: JP 2005-78784 A
Patent document 3: JP 2003-7030 A
Patent document 4: JP 2006-92611 A

SUMMARY OF THE INVENTION

In order to achieve the above object, the tape reel of the present invention includes: a cylindrical hub for winding recording tape; and a pair of upper and lower flanges respectively projecting circumferentially from upper and lower portions of the hub. The tape reel further comprises: a lower piece including the lower flange and a first cylinder wall formed integrally with the lower flange; and an upper piece including the upper flange and a second cylinder wall formed integrally with the upper flange. The hub is formed in a double cylinder form by a fit engagement between the first cylinder wall of the lower piece and the second cylinder wall of the upper piece.

DETAILED DESCRIPTION OF THE INVENTION

Figure 1:
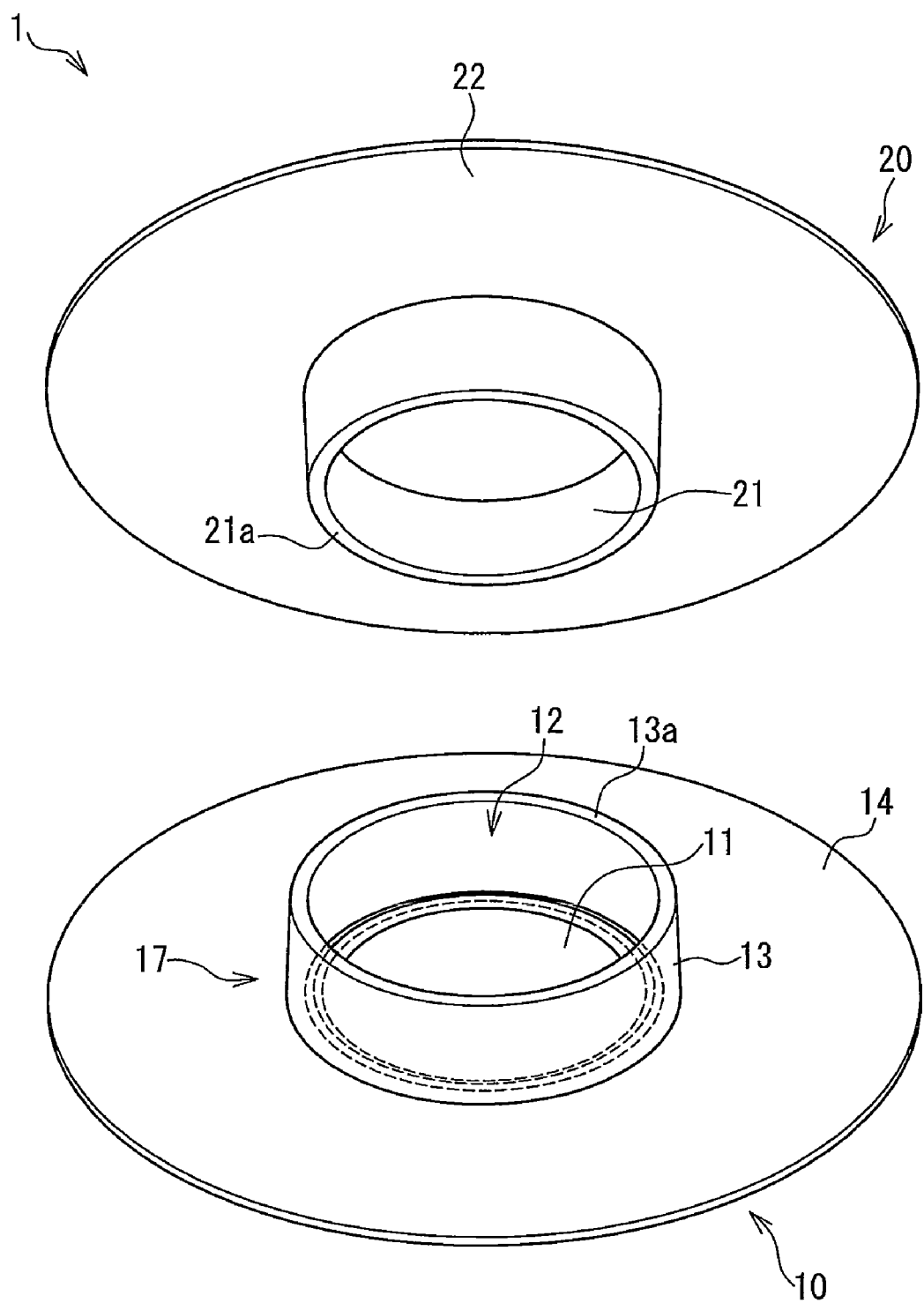
FIG. 1 is an exploded perspective view showing a tape reel according to one embodiment of the present invention.

In the tape reel of the present invention, the cylinder walls that are respectively molded integrally with the upper and the lower flanges are provided respectively on the upper and the lower pieces, and the hub is formed in a double cylinder form by a fit engagement between both cylinder walls. Thus, the rigidity of the hub can be enhanced by increasing the thickness of the entire hub without increasing the wall thickness of the cylinder wall in each piece.

Thus, since the upper end portion of the hub is prevented from deforming inwardly due to being tightened by a winding force of the recording tape, it is possible to prevent one side of the recording tape from being stretched. Further, since a precise driving height of the recording tape can be ensured favorably, it is possible to prevent the occurrence of defective performances such as recording and reproduction errors. Accordingly, it is possible to improve the reliability of a tape cartridge into which the tape reel of the present invention is incorporated.

Further, it is not necessary to increase the wall thickness of the cylinder wall of each piece. As a result, the thicknesses of the flanges and the cylinder walls can be easily made uniform as much as possible, and the occurrence of sink marks can be prevented effectively.

Therefore, since it is not necessary to include a glass filler and the like in the molding material for the cylinder walls, an increase in the product unit price can be prevented and a burden on a molding machine and a mold can be reduced. Also in this regard, it is possible to prevent an increase in the product unit price.

In the tape reel of the present invention, it is preferable that a structure of the double cylinder form is for preventing the hub from deforming inwardly when winding the recording tape around the hub. According to this configuration, it is possible to prevent one side of the recording tape from being stretched and to ensure the precise driving height of the recording tape favorably.

Further, in the first cylinder wall and the second cylinder wall that form the hub, it is preferable that an inner cylinder wall has a height that is ½ or more of that of an outer cylinder wall. According to this configuration, part of the outer cylinder wall from the upper end portion to the center of the outer cylindrical wall in the height direction where deformation due to being tightened by winding the recording tape is likely to occur can be supported by the inner cylinder wall from the back side.

Further, it is preferable that at a portion where the first cylinder wall and the second cylinder wall are in a fit engagement, it is preferable that a surface of the first cylinder wall and that of the second cylinder wall overlap with one other. According to this configuration, it is advantageous for preventing the hub from deforming inwardly.

Further, it is preferable that the lower piece forms a cylindrical body with a bottom composed of a hub bottom wall and the first cylinder wall, in the inside of the cylindrical body with a bottom, a mounting groove is formed on an outer peripheral portion of the hub bottom wall, and an end portion of the second cylinder wall of the upper piece is fitted into and is in engagement with the mounting groove. According to this configuration, it is possible to prevent the lower end portion of the second cylinder wall from being suspended, and it is also possible to prevent the second cylinder wall from being suspended along the first cylinder wall.

Further, it is preferable that the fit engagement between the first cylinder wall and the second cylinder wall is an interference fit. According to this configuration, a compression stress is applied to the inner cylinder wall due to a pressure by the outer cylinder wall, so that the opposing wall surfaces of the inner cylinder wall and the outer cylinder wall can be firmly brought into intimate contact. In this state, the hub has a virtual laminate structure, which is advantageous for enhancing the rigidity of the hub.

Further, it is preferable that a portion that is in the interference fit is ½ or more of a height of the outer cylinder wall in the first and the second cylinder walls that form the hub. According to this configuration, an effect of enhancing the rigidity by the interference fit can be exerted easily.

Further, it is preferable that in the first and the second cylinder walls that forms the hub, an inner cylinder wall includes a notch, and a portion on which the notch is formed is in a single cylinder form. According to this configuration, even when the locking mechanism is housed in the cylindrical portion, the thickness of the inner cylinder wall can be ensured while maintaining the outer dimensions of the outer cylinder wall. Thus, a highly rigid double wall structure can be achieved.

Hereinafter, one example of the present invention will be described in detail with reference to the drawings.

FIG. 1 is an exploded perspective view showing a tape reel according to one embodiment of the present invention. As shown in the figure, a tape reel 1 includes a lower piece 10 and an upper piece 20 that are molded separately.

The lower piece 10 is a molded product made of plastic, and is composed of a cylindrical body 17 and a disc-shaped lower flange 14 formed integrally with the cylindrical body 17 and projecting from the outer periphery of the lower end of the cylindrical body 17. The cylindrical body 17 is in the form of a cylinder having a bottom and an upper opening 12, and is composed of a hub bottom wall 11 and an outer cylinder wall 13.

The upper piece 20 is a molded product made of plastic, and is composed of an inner cylinder wall 21 and a disc-shaped upper flange 22 formed so as to project from the upper end of the inner cylinder wall 21.

Figure 2:
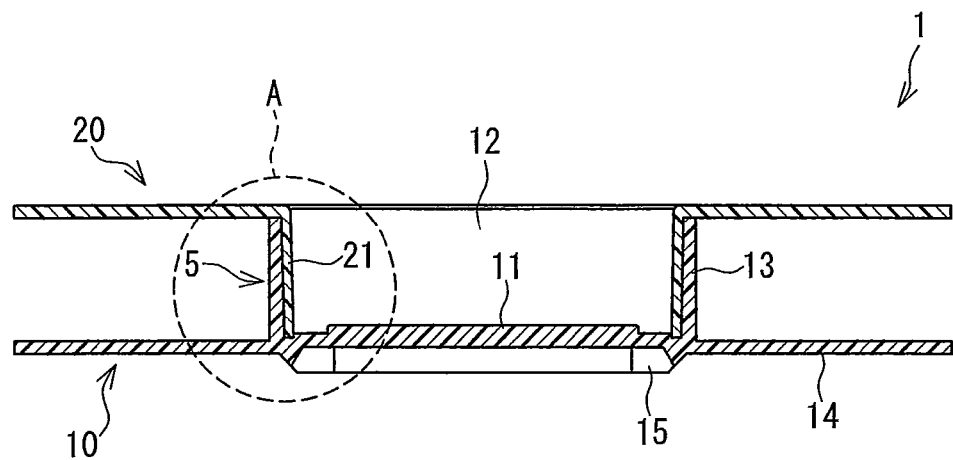
FIG. 2 is a cross-sectional view showing a state where a lower piece 10 and an upper piece 20 are coupled.

FIG. 2 is a cross-sectional view showing a state in which the lower piece 10 and the upper piece 20 are coupled. The inner cylinder wall 21 of the upper piece 20 is fitted in the outer cylinder wall 13 of the lower piece 10. Drive teeth 15 with which a drive shaft of a tape drive engages are formed on the lower surface of the hub bottom wall 11 of the lower piece 10.

Figure 3:
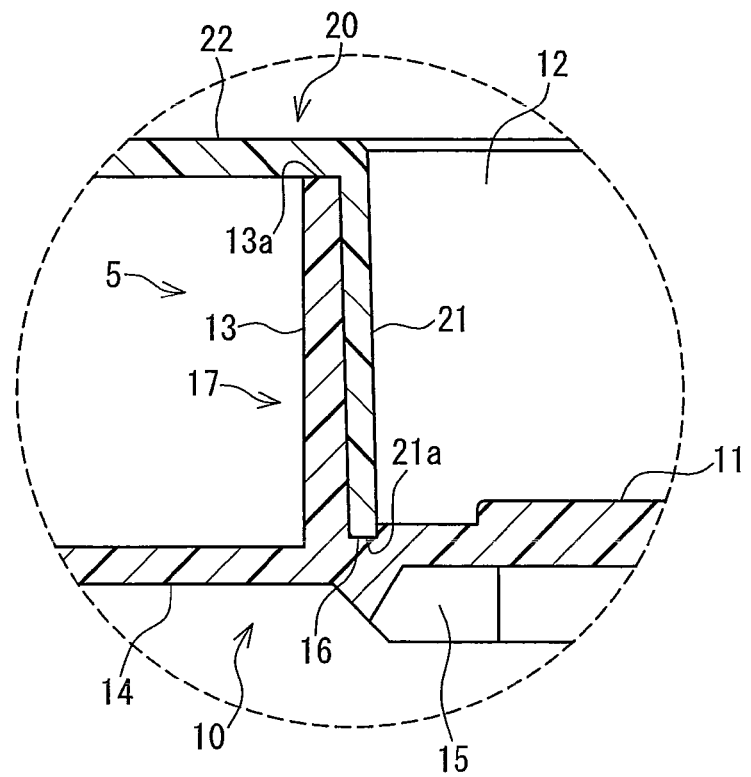
FIG. 3 is an enlarged view of the portion A in FIG. 2.

FIG. 3 is an enlarged view of the portion A in FIG. 2. In the inside of the outer cylinder wall 13 of the lower piece 10, a mounting groove 16 is formed on an outer peripheral portion of the hub bottom wall 11. The mounting groove 16 is a concave portion that is formed in a circle. A lower end portion 21a of the inner cylinder wall 21 of the upper piece 20 is fitted into and is in engagement with the mounting groove 16.

As shown in FIG. 3, the outer cylinder wall 13 of the lower piece 10 is tapered, and its wall thickness gradually and slightly decreases in the upward direction.

When coupling the lower piece 10 and the upper piece 20, the inner cylinder wall 21 of the upper piece 20 is dropped into the outer cylinder wall 13 from the upper opening 12 side of the lower piece 10. Then, the inner cylinder wall 21 of the upper piece 20 is fitted into the outer cylinder wall 13 by pressing the inner cylindrical wall 21 into the outer cylindrical wall 13 until the lower end portion 21a of the inner cylinder wall 21 is fitted into and engages with the mounting groove 16, and an upper end 13a of the outer cylinder wall 13 is received by the back surface of the upper flange 22.

Through the above procedure, the reel 1 is completed. As shown in FIGS. 2 and 3, in this complete state, a hub 5 with a double cylinder form is formed by a fit engagement between the outer cylinder wall 13 of the lower piece 10 and the inner cylinder wall 21 of the upper piece 20, and the lower piece 10 and the upper piece 20 are coupled together.

Figure 4:
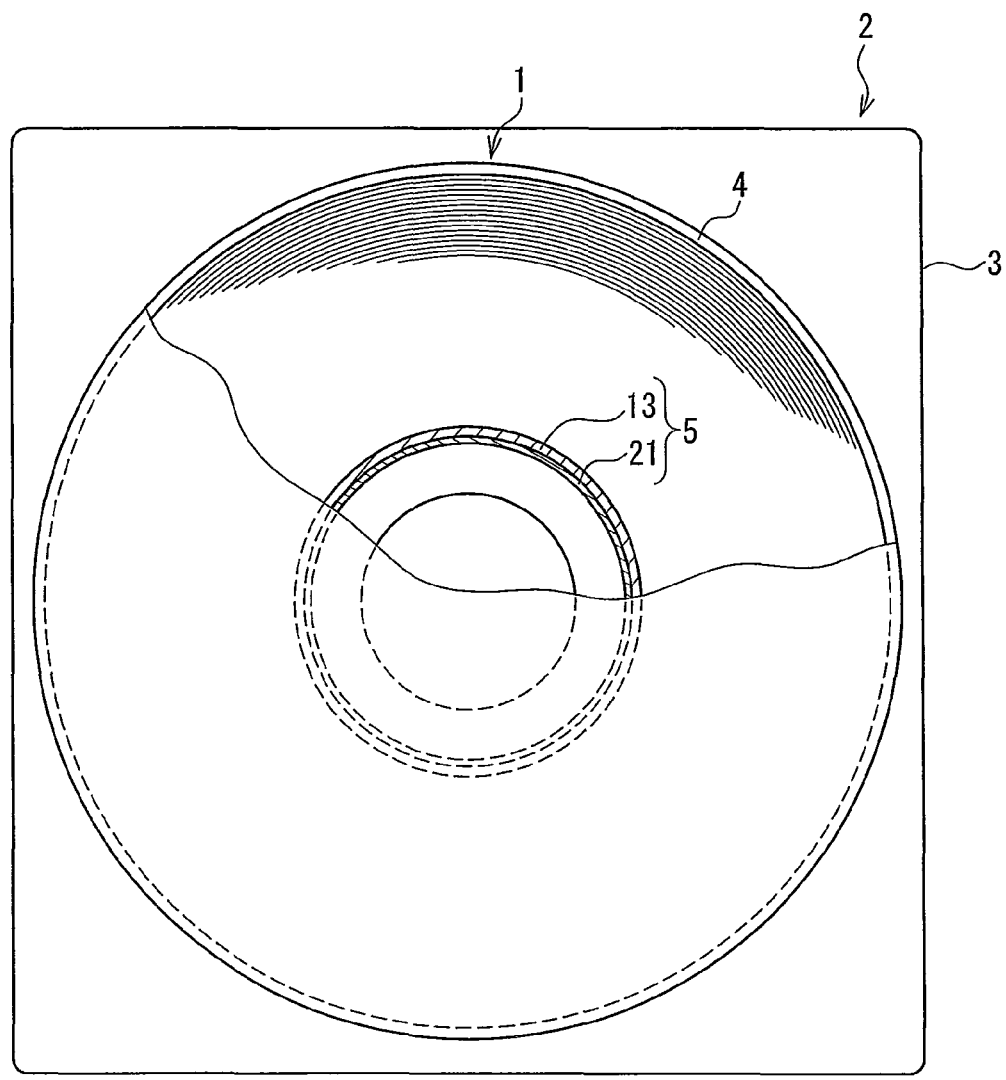
FIG. 4 is a plan view showing a tape cartridge according to one embodiment of the present invention.

FIG. 4 is a plan view showing a tape cartridge according to the present embodiment. The figure shows an example in which the tape reel 1 shown in FIG. 2 is applied to a single reel tape cartridge. In a tape cartridge 2, one tape reel is disposed in a case body 3. The case body 3 has a four-sided box shape and is formed by the engagement between upper and lower plastic cases. Recording tape 4 on which information signals are recorded is wound around the outer surface of the hub 5 of the tape reel 1.

Hereinafter, the tape reel 1 according to the present embodiment will be described in more detail. As described above, the outer cylinder wall 13 of the lower piece 10 and the inner cylinder wall 21 of the upper piece 20 are in a fit engagement (see FIGS. 2 and 3). The fit engagement may be an interference fit. In this case, as shown in FIG. 1, the outer diameter of the inner cylinder wall 21 of the upper piece 20 is set slightly larger than the inner diameter of the outer cylinder wall 13 of the lower piece 10 before coupling the lower piece 10 and the upper piece 20.

According to this setting, in the coupled state where the inner cylinder wall 21 is completely inserted in the outer cylindrical wall 13 as shown in FIGS. 2 and 3, against a force that makes the inner cylinder wall 21 expand in the outward direction, a reactive force that makes the inner cylinder wall 21 shrink in the inward direction is applied to the inner cylinder wall 21 from the outer cylinder wall 13. As a result, a compressive stress is applied to the inner cylinder wall 21 due to a pressure by the outer cylinder wall 13. That is, in the coupled state as shown in FIGS. 2 and 3, the inner cylinder wall 21 and the outer cylinder wall 13 are in a fit engagement by interference fit.

In the present embodiment, the rigidity of the hub 5 is enhanced by forming the hub 5 in a double cylinder form. Thus, for example, even if a large winding force is applied to the hub 5 in a high temperature, it is possible to counteract the winding force of the recording tape 4. Thus, it is possible to prevent the hub 5 from deforming inwardly.

Further, the outer cylinder wall 13 of the lower piece 10 and the inner cylinder wall 21 of the upper piece 20 can be in a fit engagement by placing one surface on the other. This is also advantageous for preventing the hub 5 from deforming inwardly.

Further, when the outer cylinder wall 13 of the lower piece 10 and the inner cylinder wall 21 of the upper piece 20 are in a fit engagement by an interference fit, a compression stress is applied to the inner cylinder wall 21 due to a pressure by the outer cylinder wall 13 as described above, so that the opposing wall surfaces of the inner cylinder wall 21 and the outer cylinder wall 13 can be firmly brought into intimate contact. In this state, the hub 5 has a virtual laminate structure, which is advantageous for enhancing the rigidity of the hub 5. Therefore, the hub 5 displays excellent winding drag, which is further advantageous for preventing the hub 5 from deforming inwardly.

It should be noted that although the outer cylinder wall 13 and the inner cylinder wall 21 may be entirely in an interference fit, they may be partially in an interference fit. Specifically, it is preferable that a portion where the cylinder walls are in an interference fit is ½ or more of a height h2 (see FIG. 5) of the outer cylinder wall 13. According to this configuration, an effect of enhancing the rigidity by the interference fit can be exerted easily.

Furthermore, as described above, in the present embodiment, the mounting groove 16 (see FIG. 3) is formed on the lower piece 10, and the lower end portion 21a of the inner cylinder wall 21 of the upper piece 20 is fitted into and engages with the mounting groove 16. Thus, it is possible to prevent the lower end portion 21a from being suspended, and it is also possible to prevent the inner cylinder wall 21 from being suspended along the outer cylinder wall 13. Also in this respect, the rigidity of the hub 5 can be enhanced.

It should be noted that as long as rigidity necessary for the hub 5 is ensured by a fit engagement between the outer cylinder wall 13 and the inner cylinder wall 21, the mounting groove 16 may be omitted.

According to the present embodiment, the rigidity of the hub 5 can be enhanced without increasing the wall thickness of the outer cylinder wall 13 and the inner cylinder wall 21. Therefore, the wall thicknesses of the flanges 14 and 22, the outer cylinder wall 13, and the inner cylinder wall 21 can be easily made uniform as much as possible, and the sink marks that appear due to the molding can be prevented effectively. Furthermore, it is not necessary to include a glass filler and the like in the outer cylinder wall 13 and the inner cylinder wall 21. Thus, an increase in the product unit price can be suppressed, and a burden on a molding machine and a mold can be reduced.

Figure 5:
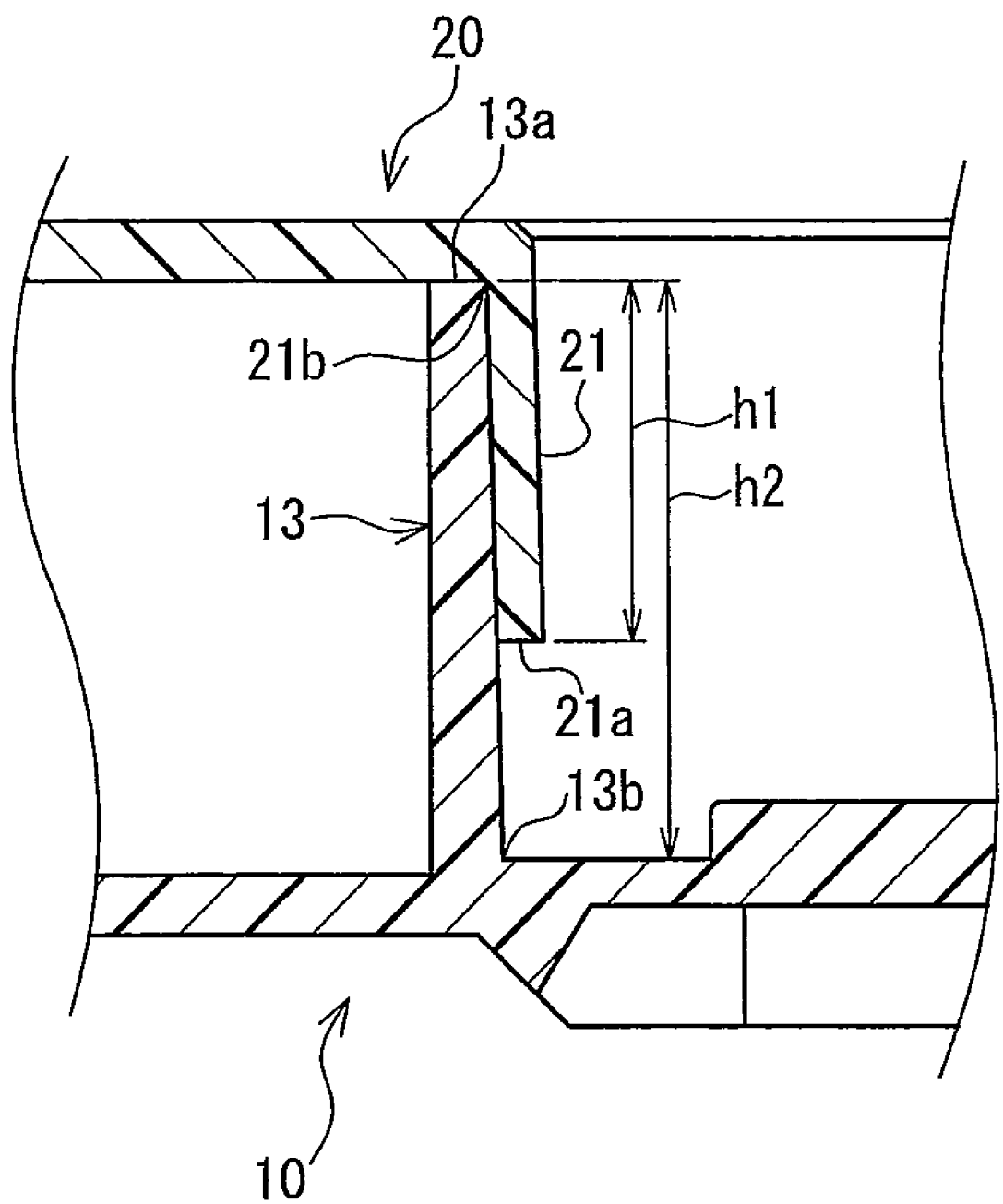
FIG. 5 is a cross-sectional view showing another example of one embodiment of the present invention.

FIG. 5 is a cross-sectional view showing another example of the present embodiment. This figure corresponds to the cross-sectional view of FIG. 3. In the configuration shown in FIG. 3, the inner cylinder wall 21 is entirely in contact with the outer cylinder wall 13 in the height direction. In contrast, in the configuration shown in FIG. 5, the area on the inner cylinder wall 21 that is in contact with the outer cylinder wall 13 is only about half the size of the height h2 of the outer cylinder wall 13.

According to this configuration, part of the outer cylinder wall 13 from the upper end portion 13a to the center of the outer cylindrical wall 13 in the height direction where deformation due to being tightened by winding the recoding tape is likely to occur can be supported by the inner cylinder wall 21 from the back side. More specifically, it is preferable that a height h1 of the inner cylinder wall 21, which is from a base portion 21b to the upper end portion 21a, is ½ or more of the height h2 of the outer cylinder wall 13, which is from a base portion 13b to the upper end portion 13a.

Figure 6:
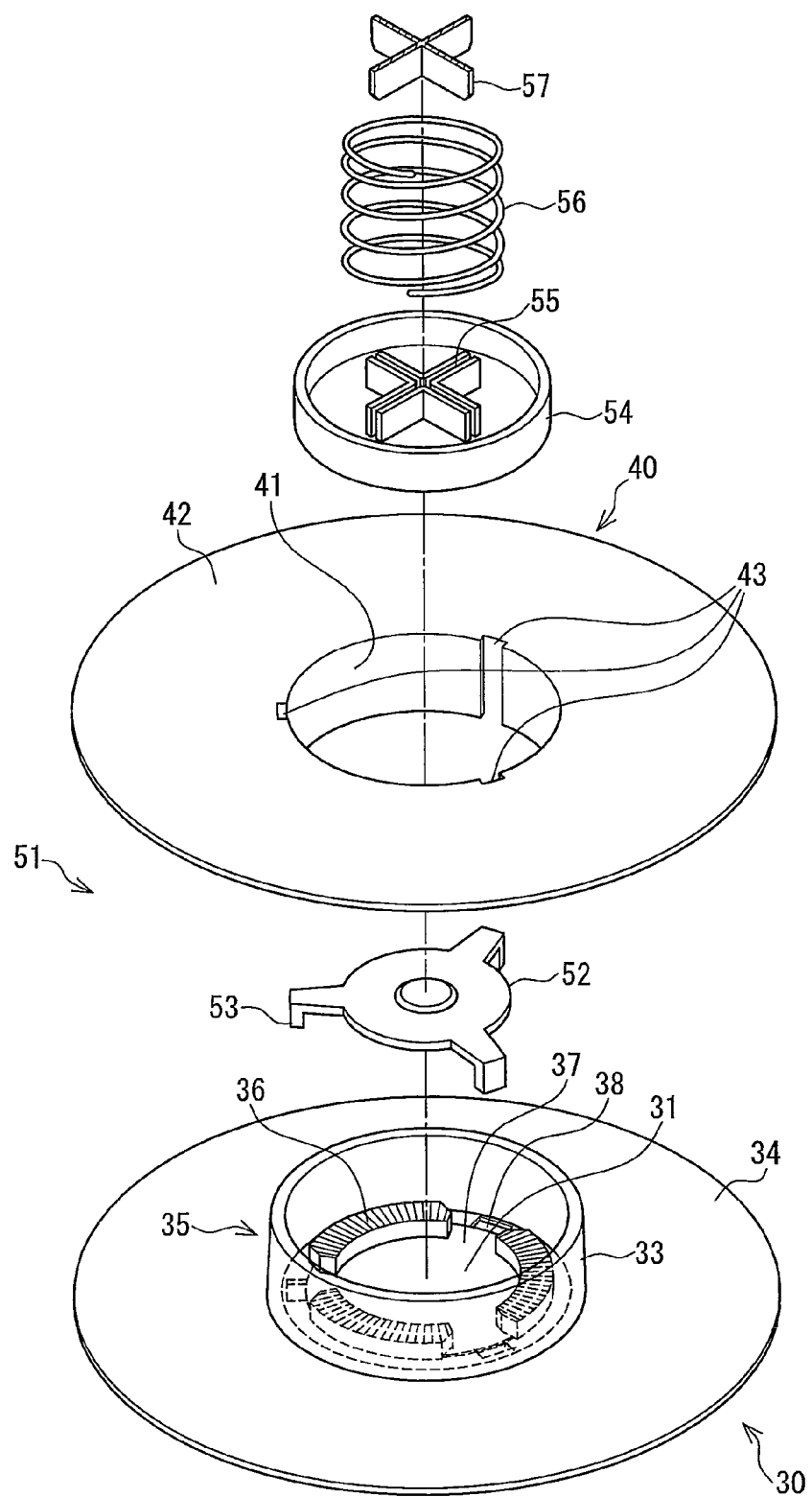
FIG. 6 is an exploded perspective view showing yet another example of one embodiment of the present invention.

FIG. 6 is an exploded perspective view showing yet another example of the present embodiment. A tape reel 51 shown in this figure is for a tape cartridge having a reel locking mechanism. The reel locking mechanism regulates rotation of the tape reel 51 when the tape cartridge is not in use, and it releases the regulation and allows the tape reel 51 to rotate when the tape cartridge is in use.

Since the basic configuration of the tape reel 51 is similar to that of the tape reel 1 shown in FIG. 1, hereinafter the differences will be mainly described. An upper piece 40 is composed of an inner cylinder wall 41 and a disk-shaped upper flange 42 formed so as to project from the upper end of the inner cylinder wall 41. Notches 43 are formed on the inner cylinder wall 41. Although details will be described later, when the inner cylinder wall 41 is fitted into and engages with an outer cylinder wall 33 of a lower piece 30, the portions on which the notch 43 is formed are not in a double cylinder form but in a single cylinder form.

The lower piece 30 is composed of a cylindrical body 35 and a disk-shaped lower flange 34. The cylindrical body 35 is composed of a hub bottom wall 31 and an outer cylinder wall 33. Gears 36 are formed on the lower surface of the hub bottom wall 31 along the circumference of the outer cylinder wall 33.

A non-gear portion 37 on which the gear 36 is not formed is provided between the adjoining gears 36. Holes 38 are formed inside the outer cylinder wall 33 so as to correspond to the non-gear portions 37.

A lock releasing member 52 includes three hooks 53, and the three hooks 53 respectively engage with the three holes 38. A pressure member 54 is pressed against the hub bottom wall 31 side by the repulsion of a spring 56. Furthermore, a cross-shaped groove 55 of the pressure member 54 engages with a cross-shaped rib 57 that is formed integrally with the case 3 (see FIG. 4).

By this engagement, rotation of the pressure member 54 is regulated. Further, since the gears 36 on the hub bottom wall 31 engage with a gear formed on the back surface of the pressure member 54 that is regulated from being rotated, the rotation of the tape reel 51 is also regulated.

When rotating the tape reel 51, by the hooks 53 being lifted by a drive shaft (not shown) of a tape drive, the pressure member 54 is lifted against the repulsion of the spring 56 and the engagement between the gears 36 on the hub bottom wall 31 and the gear on the back surface of the pressure member 54 is released.

In this state, the tape reel 51 becomes rotatable. Specifically, the tape reel 51 is rotated due to the rotation of the drive shaft in a state where a gear on the drive shaft of the tape drive and the gear on the lower surface of the tape reel 51 are in engagement.

Figure 7:
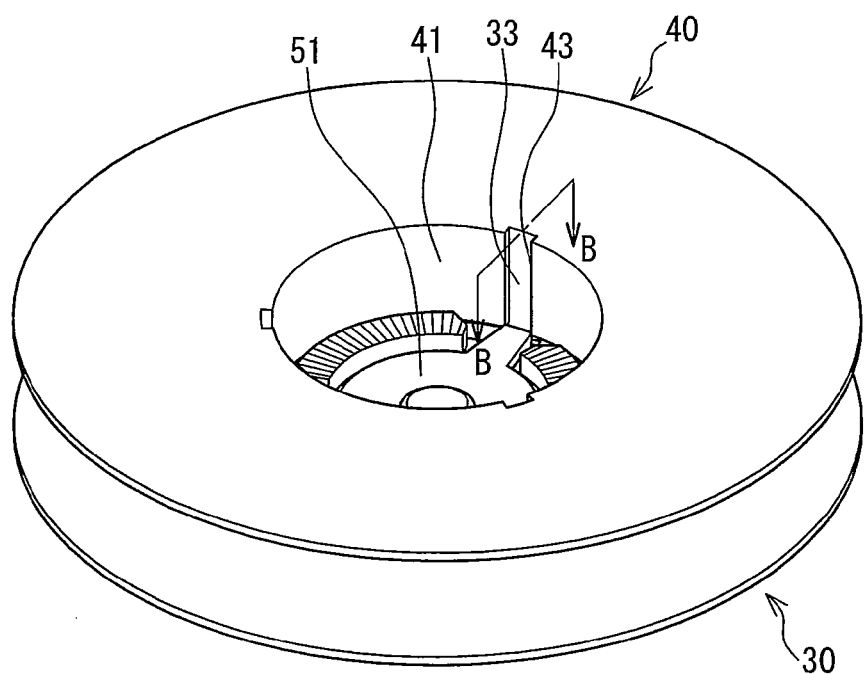
FIG. 7 is a perspective view showing a state where the lower piece 30 and the upper piece 40 in FIG. 6 are coupled.
Figure 8:
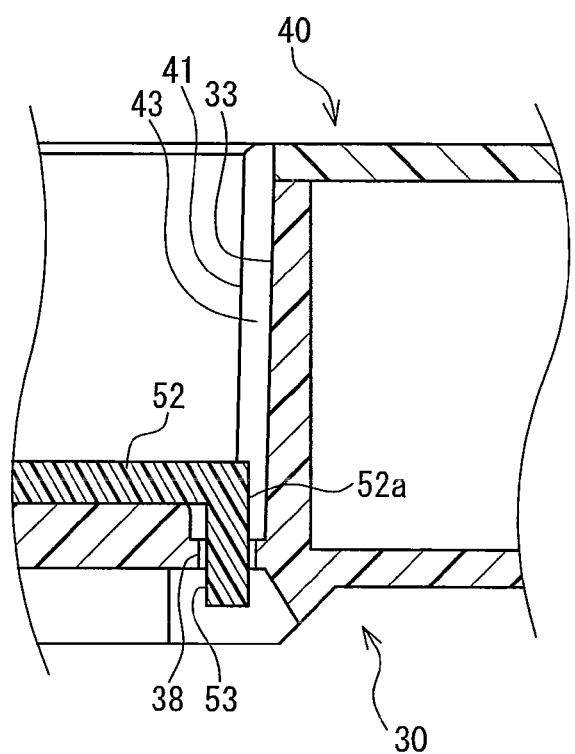
FIG. 8 is a cross-sectional view along the line B-B in FIG. 7.

FIG. 7 is a perspective view showing a state in which the lower piece 30 and the upper piece 40 are coupled. FIG. 8 is a cross-sectional view along the line B-B in FIG. 7. In the state shown in FIG. 7, the inner cylinder wall 41 of the upper piece 40 is fitted into the outer cylinder wall 33 (see FIG. 6) of the lower piece 30. As shown in FIGS. 7 and 8, from the portions on which the notch 43 is formed, the outer cylinder wall 33 of the lower piece 30 is exposed. That is, the portions are not in a double cylinder form but in a single cylinder form.

As shown in FIG. 8, the hook 53 of the lock releasing member 52 and the hole 38 are in engagement. An end surface 52a of the lock releasing member 52 is in a step formed between the inner surface of the inner cylinder wall 41 and the outer surface of the outer cylinder wall 33 by the notch 43.

Here, as shown in FIG. 3, when the inner cylinder wall 21 of the upper piece 20 is fitted into the outer cylinder wall 13 of the lower piece 10, the inner diameter of the space above the hub bottom wall 11 becomes small by the wall thickness of the inner cylinder wall 21. When attaching the lock releasing member 52 as in FIG. 6, this configuration is disadvantageous for ensuring the size of space to which the lock releasing member 52 is attached.

In the embodiment shown in FIGS. 7 and 8, the end surface 52a of the lock releasing member 52 is in a step formed between the inner surface of the inner cylinder wall 41 and the outer surface of the outer cylinder wall 33 by the notch 43. In other words, the space achieved by this step is used as space to which the lock releasing member 52 is attached. Therefore, in the configuration shown in FIGS. 6 to 8, even when the locking mechanism is housed in the cylindrical portion, the thickness of the inner cylinder wall 41 can be ensured while maintaining the outer dimensions of the outer cylinder wall 33. Thus, a highly rigid double wall structure can be achieved.

In the above embodiment, the cylindrical hubs are composed respectively of the outer cylinder wall 13 of the lower pieces 10 and the inner cylinder wall 21 of the upper pieces 20, and the outer cylinder wall 33 of the lower pieces 30 and the inner cylinder wall 41 of the upper pieces 40. However, these inner and outer cylinder walls may be the other way around. That is, an inner cylinder wall may be provided on the lower pieces 10 and 30, an outer cylinder wall may be provided on the upper pieces 20 and 40, and the inner cylindrical walls and the outer cylinder walls may be respectively brought into a fit engagement.

The method for fixing the outer cylinder wall 13 and the inner cylinder wall 21 to each other and the outer cylinder wall 33 and the inner cylinder wall 41 to each other is not limited to interference fit, and various methods can be used. For example, each pair may be fixed to each other by setting the outer dimensions of the inner cylinder walls 21 and 41 slightly smaller than the inner dimensions of the outer cylinder walls 13 and 33, and welding each pair after clearance fitting each inner cylinder wall and each outer cylinder wall.

As described above, according to the present invention, it is possible to prevent the hub from being tilted inwardly by enhancing the rigidity of the hub with a simple configuration. Therefore, the tape reel of the present invention is useful as, for example, a tape reel housed in a tape cartridge.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A tape reel comprising: a cylindrical hub for winding recording tape; and a pair of upper and lower flanges respectively projecting circumferentially from upper and lower portions of the hub, wherein the tape reel further comprises: a lower piece including the lower flange and a first cylinder wall formed integrally with the lower flange; and an upper piece including the upper flange and a second cylinder wall formed integrally with the upper flange, the hub is formed in a double cylinder form by a fit engagement between the first cylinder wall of the lower piece and the second cylinder wall of the upper piece, wherein the lower piece forms a cylindrical body with a bottom composed of a hub bottom wall and the first cylinder wall, in the inside the cylindrical body with the bottom, a mounting groove is formed on an outer peripheral portion of the hub bottom wall, and an end portion of the second cylinder wall of the upper piece is fitted into and is in engagement with the mounting groove.

2. The tape reel according to claim 1, wherein a structure of the double cylinder form is for preventing the hub from deforming inwardly when winding the recording tape around the hub.

3. The tape reel according to claim 1, wherein in the first cylinder wall and the second cylinder wall that form the hub, an inner cylinder wall has a height that is ½ or more of that of an outer cylinder wall.

4. The tape reel according to claim 1, wherein at a portion where the first cylinder wall and the second cylinder wall are in a fit engagement, a surface of the first cylinder wall and that of the second cylinder wall overlap with one other.

5. The tape reel according to claim 1, wherein the fit engagement between the first cylinder wall and the second cylinder wall is an interference fit.

6. The tape reel according to claim 5, wherein a portion that is in the interference fit is ½ or more of a height of an outer cylinder wall in the first and the second cylinder walls that form the hub.

7. A tape reel comprising: a cylindrical hub for winding recording tape; and a pair of upper and lower flanges respectively projecting circumferentially from upper and lower portions of the hub,
   wherein the tape reel further comprises: a lower piece including the lower flange and a first cylinder wall formed integrally with the lower flange; and an upper piece including the upper flange and a second cylinder wall formed integrally with the upper flange,
   the hub is formed in a double cylinder form by a fit engagement between the first cylinder wall of the lower piece and the second cylinder wall of the upper piece,
   wherein of the first and the second cylinder walls that form the hub, an inner cylinder includes a notch formed to expose an outer cylinder wall, and a portion of the hub on which the notch is formed is in a single cylinder form.

8. The tape reel according to claim 7, wherein a structure of the double cylinder form is for preventing the hub from deforming inwardly when winding the recording tape around the hub.

9. The tape reel according to claim 7, wherein in the first cylinder wall and the second cylinder wall that form the hub, an inner cylinder wall has a height that is ½ or more of that of an outer cylinder wall.

10. The tape reel according to claim 7, wherein at a portion where the first cylinder wall and the second cylinder wall are in a fit engagement, a surface of the first cylinder wall and that of the second cylinder wall overlap with one other.

11. The tape reel according to claim 7, wherein the lower piece forms a cylindrical body with a bottom composed of a hub bottom wall and the first cylinder wall,
   in the inside the cylindrical body with the bottom, a mounting groove is formed on an outer peripheral portion of the hub bottom wall, and
   an end portion of the second cylinder wall of the upper piece is fitted into and is in engagement with the mounting groove.

12. The tape reel according to claim 7, wherein the fit engagement between the first cylinder wall and the second cylinder wall is an interference fit.

13. The tape reel according to claim 12, wherein a portion that is in the interference fit is ½ or more of a height of an outer cylinder wall in the first and the second cylinder walls that form the hub.

* * * * *